US012445863B2

(12) United States Patent
Mo et al.

(10) Patent No.: US 12,445,863 B2
(45) Date of Patent: Oct. 14, 2025

(54) MOBILITY ROBUSTNESS USING JOINT PHASE-TIME ARRAYS

(71) Applicant: Samsung Electronics Co., Ltd., Suwon-si (KR)

(72) Inventors: Jianhua Mo, Allen, TX (US); Boon Loong Ng, Plano, TX (US); Jianzhong Zhang, Plano, TX (US); Vishnu Vardhan Ratnam, Plano, TX (US); Ahmad AlAmmouri, Garland, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 359 days.

(21) Appl. No.: 18/306,066

(22) Filed: Apr. 24, 2023

(65) Prior Publication Data

US 2023/0362671 A1    Nov. 9, 2023

Related U.S. Application Data

(60) Provisional application No. 63/339,256, filed on May 6, 2022.

(51) Int. Cl.
*H04W 16/28* (2009.01)
*H04B 7/06* (2006.01)
*H04W 72/1273* (2023.01)
*H04W 72/232* (2023.01)

(52) U.S. Cl.
CPC .......... *H04W 16/28* (2013.01); *H04B 7/0617* (2013.01); *H04W 72/1273* (2013.01); *H04W 72/232* (2023.01)

(58) Field of Classification Search
CPC ............ H04W 16/28; H04W 72/1273; H04W 72/232; H04B 7/0617; H04B 7/0408; H04B 7/0695
See application file for complete search history.

(56) References Cited

U.S. PATENT DOCUMENTS

| | | | |
|---|---|---|---|
| 9,445,282 B2 | 9/2016 | Chen et al. | |
| 10,559,880 B1 | 2/2020 | Garrett et al. | |
| 11,165,151 B2 | 11/2021 | Runyon | |
| 2021/0321447 A1* | 10/2021 | Lee | H04L 1/0013 |
| 2021/0384932 A1* | 12/2021 | O'Sullivan | H03F 1/42 |
| 2022/0015100 A1* | 1/2022 | Yerramalli | H04L 5/0023 |
| 2022/0123812 A1 | 4/2022 | Osterling | |
| 2022/0278724 A1* | 9/2022 | Agrawal | H04B 7/0617 |
| 2023/0362889 A1* | 11/2023 | Xu | H04W 52/0219 |
| 2024/0215065 A1* | 6/2024 | Nam | H04W 74/006 |
| 2025/0112711 A1* | 4/2025 | Nilsson | H04B 17/12 |

FOREIGN PATENT DOCUMENTS

| | | |
|---|---|---|
| AU | 658410 B2 | 4/1995 |
| CN | 112636773 B | 12/2021 |

* cited by examiner

*Primary Examiner* — Abdullahi Ahmed

(57) ABSTRACT

Methods and apparatuses for mobility robustness with joint phase-time arrays (JTPAs). A method for operating a base station (BS), includes determining, based on a wide-beam (WB) alignment procedure, a subset of beams for transmission of physical downlink shared control channels (PDSCHs). The method further includes transmitting a physical downlink control channel (PDCCH) indicating the subset of beams and transmitting the PDSCHs on the subset of beams, respectively, using a JPTA beamforming. The same data is included in each of the PDSCHs.

20 Claims, 12 Drawing Sheets

MOBILITY ROBUSTNESS USING JOINT PHASE-TIME ARRAYS

CROSS-REFERENCE TO RELATED AND CLAIM OF PRIORITY

The present application claims priority under 35 U.S.C. § 119(e) to U.S. Provisional Patent Application No. 63/339,256 filed on May 6, 2022, which is hereby incorporated by reference in its entirety.

TECHNICAL FIELD

The present disclosure relates generally to wireless communication systems and, more specifically, the present disclosure relates to mobility robustness enhancements with joint phase-time arrays (JTPAs).

BACKGROUND

As wireless communication has grown and the number of subscribers to wireless communication services continues to grow quickly, the demand for wireless data traffic is rapidly increasing due to the growing popularity among consumers and businesses. To meet the high growth in mobile data traffic and support new applications and deployments, improvements in radio interface efficiency and coverage are of paramount importance. Moreover, this demand for wireless data traffic has increased since the deployment of 4G communication systems, and to enable various vertical applications, 5G (e.g., fifth generation) communication systems have been developed and are currently being deployed. Several characteristics of such applications have also been considered.

A basic philosophy of 5G or New Radio (NR) in the 3rd Generation Partnership Project (3GPP) is to support beam-specific operations for wireless communication between a gNodeB (gNB) and user equipment (UE). Several components in the 5G NR specification can efficiently be operated in a beam-specific manner. Note that the 5G communication system involves implementation to include higher frequency millimeter-wave (mmWave) bands, such as 28 GHz or 60 GHz bands or, in general, above 6 GHz bands, to accomplish higher data rates, or in lower frequency bands, such as below 6 GHz, to enable robust coverage and mobility support.

SUMMARY

The present disclosure relates to mobility robustness enhancements with JTPAs.

In one embodiment, a base station (BS) is provided. The BS includes a processor configured to determine, based on a wide-beam (WB) alignment procedure, a subset of beams for transmission of the physical downlink shared control channels (PDSCHs). The BS further includes a transceiver operably coupled to the processor. The transceiver is configured to transmit a physical downlink control channel (PDCCH) indicating the subset of beams and transmit the PDSCHs on the subset of beams, respectively, using a JPTA beamforming. The same data is included in each of the PDSCHs.

In another embodiment, a user equipment (UE) is provided. The UE includes a processor configured to perform on a WB alignment procedure. The UE further includes a transceiver operably coupled to the processor. The transceiver is configured to receive a PDCCH indicating a subset of beams for the reception of PDSCHs, the subset of beams associated with the WB alignment procedure and receive at least one of the PDSCHs on at least one of the subset of beams using a JPTA beamforming. The same data is included in each of the PDSCHs.

In yet another embodiment, a method for operating a BS includes determining, based on a WB alignment procedure, a subset of beams for transmission of PDSCHs. The method further includes transmitting a PDCCH indicating the subset of beams and transmitting the PDSCHs on the subset of beams, respectively, using a JPTA beamforming. The same data is included in each of the PDSCHs.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Definitions for other certain words and phrases are provided throughout this patent document. Those of ordinary skill in the art should understand that in many, if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1-15, discussed below, and the various, non-limiting embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since the deployment of 4G communication systems, efforts have been made to develop an improved 5G or pre-5G communication system. Therefore, the 5G or pre-5G communication system is also called a "beyond 4G network" or a "post LTE system."

The 5G communication system is implemented in higher frequency (mmWave) bands, e.g., 60 GHz bands, to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is underway based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and non-limiting embodiments of the present disclosure may be utilized in connection with any frequency band. For example, aspects of the present disclosure may also be applied to the deployment of 5G communication systems, 6G or even later releases which may use terahertz (THz) bands.

Figure 1:
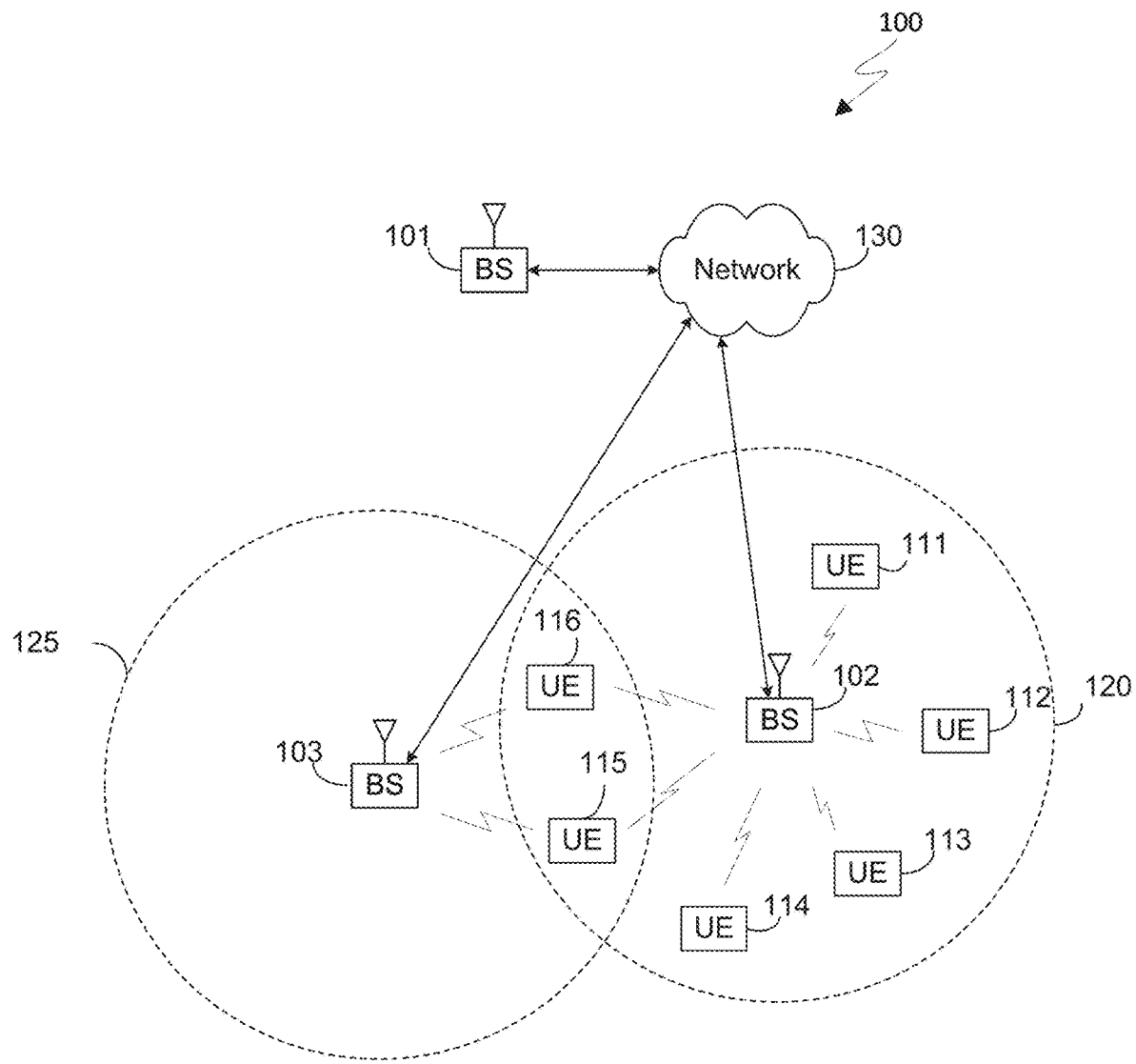
FIG. 1 illustrates an example wireless network according to embodiments of the present disclosure.
Figure 2:
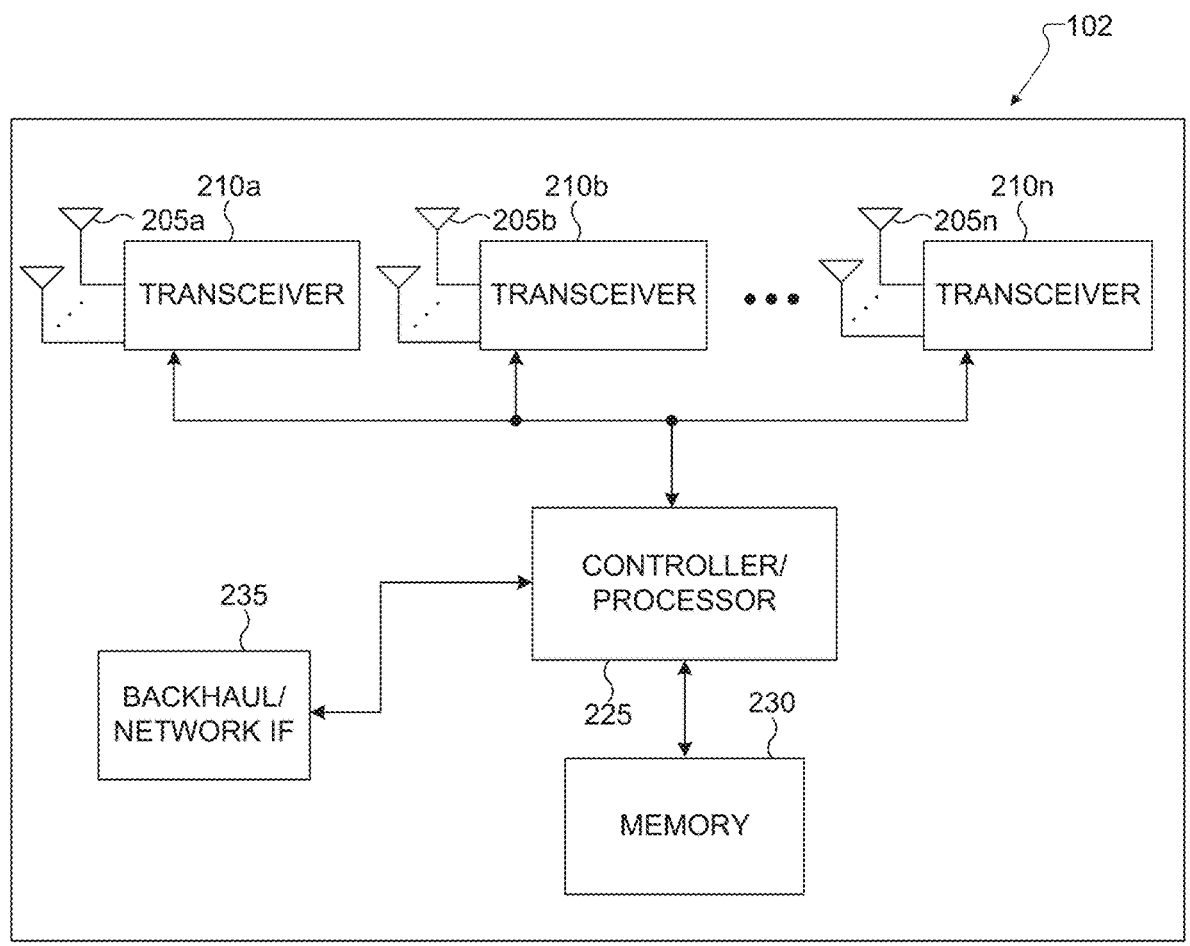
FIG. 2 illustrates an example BS according to embodiments of the present disclosure.
Figure 3:
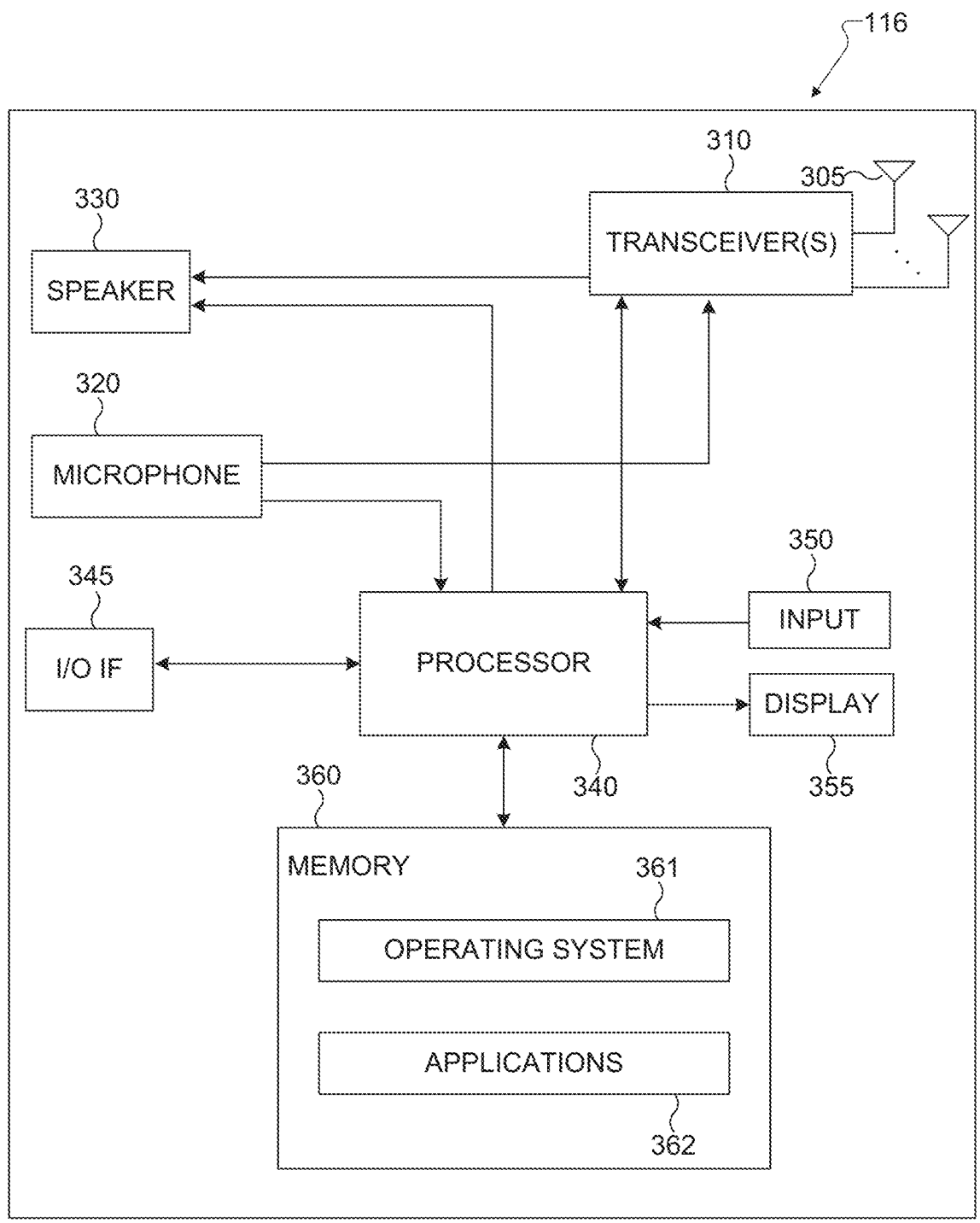
FIG. 3 illustrates an example of a UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to how different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or another data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof for utilizing mobility robustness enhancements with JTPA beamforming. In certain embodiments, one or more of the gNBs 101-103 include circuitry, programming, or a combination thereof for supporting mobility robustness enhancements with JTPAs.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as processes for mobility robustness enhancements with JTPAs as described in greater detail below. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna(s) 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals by the transceiver(s) 310 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. For example, in various embodiments, the UE 116 uses JTPA beamforming for DL receptions from eNB 102 and/or 103 for mobility robustness.

In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350 and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
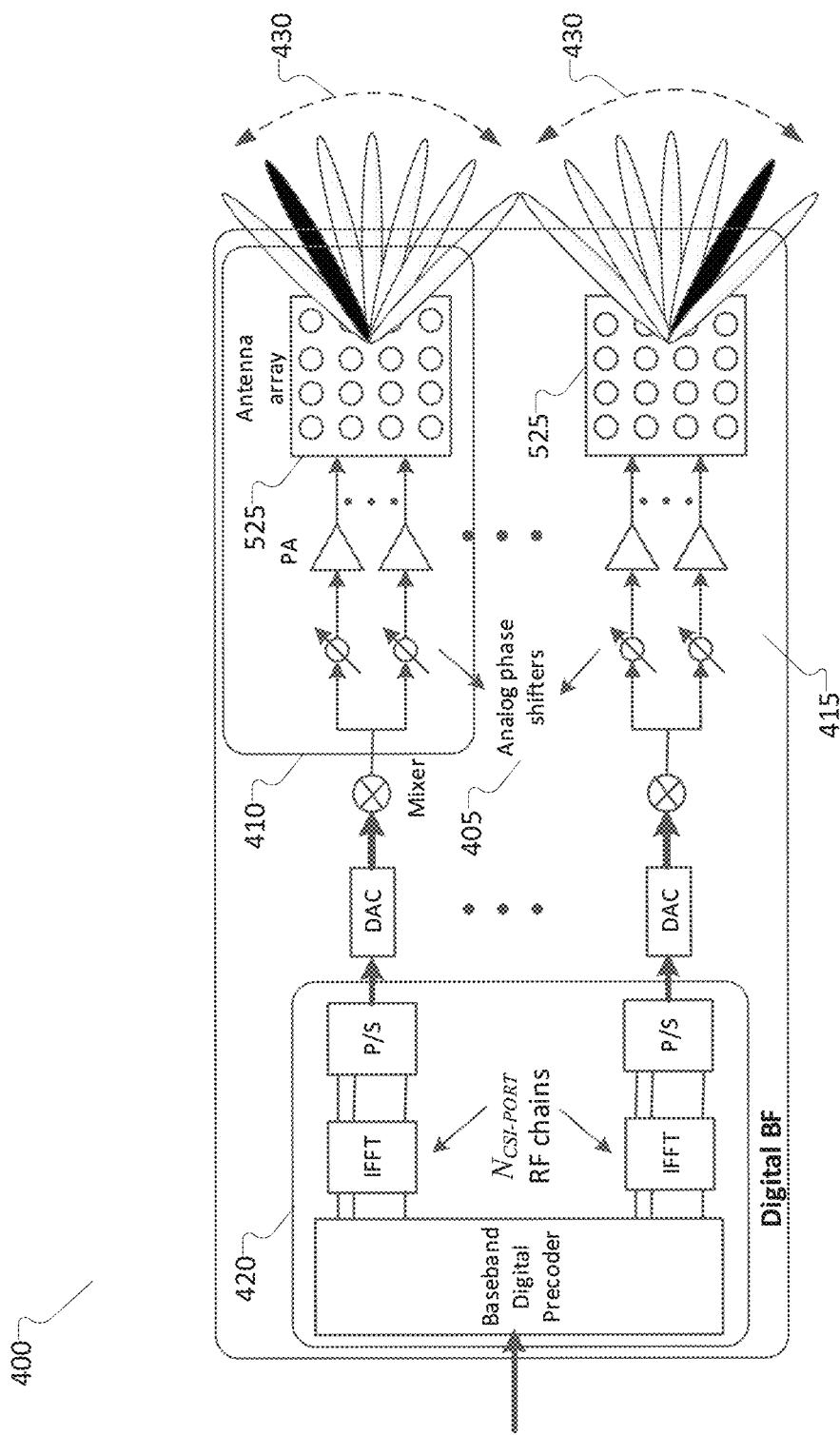
FIG. 4 illustrates an example of a transmitter structure for beamforming according to embodiments of the present disclosure.

FIG. 4 illustrates an example of a transmitter structure 400 for beamforming according to various embodiments of the present disclosure. The non-limiting embodiment of the transmitter structure 400 illustrated in FIG. 4 is for illustration only. FIG. 4 does not limit the scope of this disclosure to any particular implementation of the transmitter structure 400. In certain embodiments, one or more of gNB 102 or UE 116 include the transmitter structure 400. For example, one or more of antenna 205 and its associated systems or antenna 305 and its associated systems can be included in transmitter structure 400.

In the example shown in FIG. 4, the transmitter structure 400 includes analog phase shifters 405, an analog beamformer (BF) 410, a hybrid BF 415, a digital BF 420, and one or more antenna arrays 425. In this case, one antenna port is mapped onto many antenna elements in antenna arrays 425, which can be controlled by the bank of analog phase shifters 405. One antenna port can then correspond to one sub-array which produces a narrow analog beam through analog beamforming by analogy BF 410. The analog beam can be configured to sweep 430 across a wider range of angles by varying the phase shifter bank 405 across symbols or subframes.

Analog beamforming relies on analog hardware such as phase-shifters and switches to create the beam shapes. However, these analog hardware components create a frequency-flat response. All components of the input signal frequency undergo a similar transformation after passing through them. This reduces the flexibility of the beamforming that is possible.

Embodiments of the present disclosure recognize that, due to the rising demand for traffic, wireless systems are moving towards higher frequency of operation, such as millimeter-wave (mm-wave) and terahertz (THz) frequencies, where abundant spectrum is available. However, the higher frequencies also suffer from a high channel propagation loss, and therefore require a large antenna array to create sufficient beamforming gain to ensure sufficient link budget for operation. Thus, these high frequency systems are usually built with a large antenna array at the transmitter and/or the receiver containing many individual antenna elements. At the operating bandwidths of these mm-wave and THz systems, the cost and power consumption of mixed-signal components such as analog-to-digital converters (ADCs) and/or digital-to-analog converters (DACs) also grows tremendously. Thus, fully digital transceiver implementations, where each antenna element is fed by a dedicated radio-frequency (RF) chain, may not be practical. To keep the hardware cost and power consumption of such large antenna arrays manageable, typically an analog beamforming or hybrid beamforming architecture is adopted where the large antenna array is fed with a much smaller number of RF chains via the use of analog hardware such as phase-shifters. This reduces the number of mixed-signal components which significantly reduces the cost, size, and power consumption of the transceivers. When transmitting a signal at the transmitter, a combination of digital beamforming before DAC and analog beamforming using the phase-shifters is used to create the overall beam shape in the desired direction. Similarly, when receiving a signal at the receiver, a combination of analog beamforming using phase-shifters and digital beamforming after ADC is used to create the overall beam shape in the desired direction.

Accordingly, various embodiments of the present disclosure utilize frequency-dependent hybrid beamforming, which is referred to as JPTA beamforming. Note that, here, frequency-dependent beamforming refers to a technique where different components of the input signal may encounter a differently shaped analog beam based on their frequency.

Figure 5:
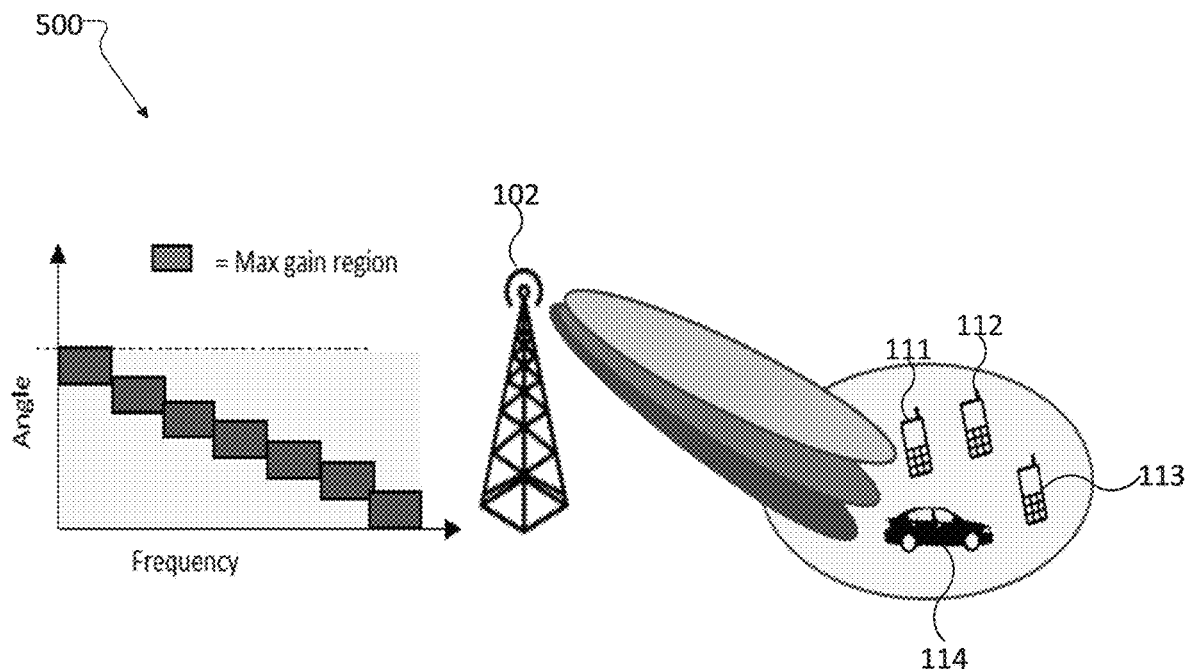
FIG. 5 illustrates an example of a JPTA beamforming according to embodiments of the present disclosure.

FIG. 5 illustrates an example of a JPTA beamforming 500 according to various embodiments of the present disclosure. For example, the JPTA beamforming 500 provides an example of the frequency varying linearly over the system bandwidth and the angular direction sweeping linearly over a certain region according to embodiments of the present disclosure. For example, the JPTA beamforming 500 may be performed in network 130 by BS 102. The JPTA beamforming 500 is for illustration only and other embodiments can be used without departing from the scope of the present disclosure.

In one example behavior of JPTA operation, the maximum gain region of the beam sweeps over an angle range as the signal frequency varies. At any signal frequency f, the desired beam creates the maximum possible array-gain in one angular direction $\theta(f)$. As f varies linearly over the system bandwidth, the angular direction $\theta(f)$ also sweeps linearly over a certain angular region $[\theta_0-\Delta\theta/2, \theta_0+\Delta\theta/2]$, as shown in FIG. 5. Embodiments in this disclosure can be applied to other behaviors of JPTA operation as well.

Figure 6:
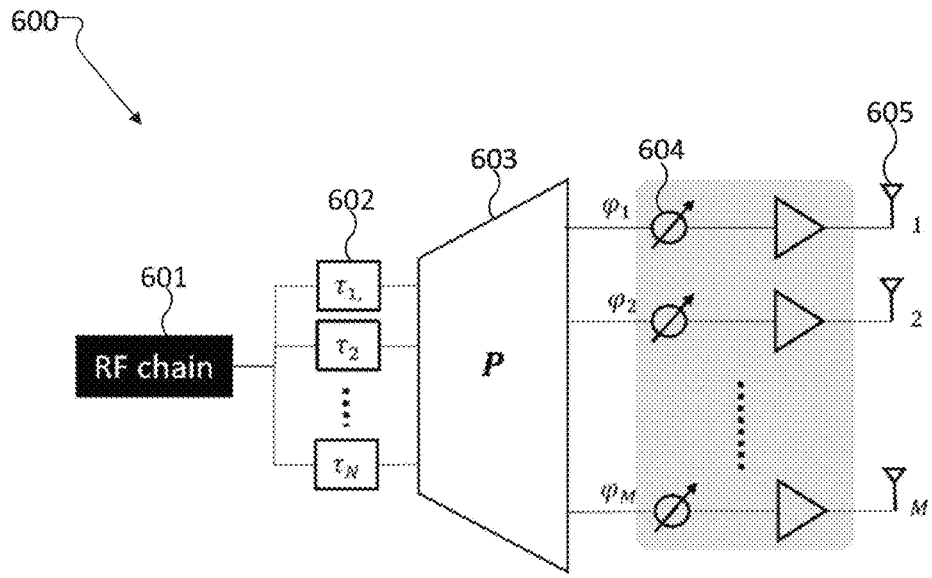
FIG. 6 illustrates an example of a BS JPTA architecture with one radio frequency (RF) chain and single phase-shifter per antenna element according to embodiments of the present disclosure.

FIG. 6 illustrates an example of a BS JPTA architecture 600 with one RF chain and single phase-shifter per antenna element according to various embodiments of the present disclosure. For example, the BS JPTA architecture 600 may be implemented in BS 102 and, more particularly, in one or more of the transceivers 210. The BS JPTA architecture 600 is for illustration only and other embodiments can be used without departing from the scope of the present disclosure.

In one embodiment, the BS 102 is assumed to have a uniform linear antenna array having M elements, and $N_{RF}=1$ RF chain. Note that the disclosure can be directly extended to planar array configurations. The antenna spacing is half-wavelength at the center frequency $f_0$. Each of the M antennas has a dedicated phase-shifter, and they are connected to the single RF chain via a network of N≤M TTDs as shown in FIG. 6. Here P is a fixed M×N mapping matrix, where each row m has one non-zero entry and determines which of the N TTDs antenna m is connected to. The TTDs are assumed to be configurable, with a delay variation range of $0 \le \tau \le \kappa W$, where $\kappa$ is a design parameter to be selected. The phase-shifters are assumed to have unit magnitude and have arbitrarily reconfigurable phase $-\pi \le \phi < \pi$. Transmission in both uplink and downlink directions is performed using OFDM with K subcarriers indexed as $$K = \left\{\left\lfloor\frac{1-K}{2}\right\rfloor, \ldots, \left\lfloor\frac{K-1}{2}\right\rfloor\right\}.$$

Then, the M×1 downlink TX signal on sub-carrier k∈K for a representative OFDM symbol can be expressed as:

$$x_k = \frac{1}{\sqrt{M}}\begin{bmatrix} e^{j\varphi_1} & \cdots & 0 \\ \vdots & \ddots & \vdots \\ 0 & \cdots & e^{j\varphi_M} \end{bmatrix} P \begin{bmatrix} e^{j2\pi f_k \tau_1} \\ \vdots \\ e^{j2\pi f_k \tau_N} \end{bmatrix} \alpha_k s_k = TPd_k \alpha_k s_k$$

where $s_k$ and $\alpha_k$ are the scalar data and digital beamforming on the k-th subcarrier, $f_k$ is the frequency of the k-th sub-carrier (including the carrier frequency), $\tau_n$ is the delay of the n-th TTD and $\phi_m$ is the phase of the m phase-shifter connected to the m-th antenna. Note that from the equation above the total transmit power of the BS can be given by $P_{sum}\Sigma_{k\in K}|\alpha_k|^2$. Note that for this JPTA architecture, the effective downlink unit-norm analog beamformer on sub-carrier k is $e_k=TPd_k$, where the M×M diagonal matrix T captures the effect of phase-shifters and the N×1 vector $d_k$ captures the effect of TTDs. It can be shown that the same beamformer is also applicable at the BS 102 for an uplink scenario.

Embodiments of the present disclosure recognize and take into consideration that certain techniques for analog-beamforming or hybrid beamforming rely on analog hardware such as phase-shifters and switches to create the beam shapes. However, these analog hardware components create a frequency-flat response, i.e., all components of the input signal frequency undergo a similar transformation after passing through them. This reduces the flexibility of the beamforming that is possible in such analog or hybrid beamforming systems, in comparison to fully-digital architectures where each antenna array is fed with a dedicated RF chain.

Embodiments of the present disclosure further recognize that the gNB may switch the beam to transmit or receive from the UEs over time, such that only one beam is used at any given time, which is referred herein to as analog beamforming (or hybrid beamforming). For analog beamforming, a gNB and sweeps the analog beams over time, in order to communicate with its UEs. To maintain connectivity with a UE, the gNB can perform a beam management procedure with the UE to achieve beam alignment between the gNB beam and the UE beam. In order to achieve beam alignment with the gNB and the UE, a hierarchical beam search procedure can be performed where the gNB determines the best WB (WB alignment) and the best NB (NB alignment) to serve the UE. The beam alignment can be performed based on a UE measurement report of the beam management RS such as one or more SSB, or one or more CSI-RS. In some examples, the wide beam and narrow beam measurement and reporting is based on the SSB and the CSI-RS, respectively. After achieving narrow beam alignment, the control and data signals can be transmitted on the PDCCH and the PDSCH, respectively, to the UE using the gNB narrow beam. The HARQ-ACK can also be received on a PUCCH using the same gNB narrow beam.

Embodiments of the present disclosure further recognize and take into consideration that the narrow beam alignment procedure is beneficial to maximize the link SNR between the gNB and the UE. However, embodiments of the present disclosure recognize that such procedures also incur latency where consequently maintaining narrow beam alignment reliably can be challenging when the UE's mobility is high, or the narrow beam's beamwidth is small due to a large antenna aperture.

Accordingly, embodiments of the present disclosure provide for methods and apparatuses to enhance beam alignment robustness. Embodiments of the present disclosure further recognize that progress has been made in the implementation of analog hardware called true-time delay (TTD). Unlike switches and phase-shifters TTDs have a frequency-dependent behavior, i.e., different components of the input signal frequency undergo different transformations after passing through them. By designing hybrid transceiver architectures where a few number of RF chains are connected to a large antenna array using TTDs, frequency-dependent or JTPA beamforming can be achieved that is more versatile than the frequency-flat beamforming methods.

For the purpose of enhancing beam alignment robustness or mobility robustness, embodiments of the present disclosure provide for methods to enable data repetition across multiple frequency resources with JPTA beamforming (e.g., with operation at the gNB and the UE), JPTA-enhanced beam management procedures, and procedure for configuring JPTA operation and the corresponding signaling methods. Besides JPTA beamforming, the embodiments in this disclosure can also be applied to other frequency-dependent or frequency-selective beamforming schemes.

In various embodiments, a JPTA operation can be employed for the purpose of enhancing beam management robustness to maintain wireless connectivity between the gNB and the UE, which can be beneficial when the channel between the gNB and the UE is experiencing high rate of change (e.g., a small channel coherence time) for example due to high UE mobility.

Figure 7:
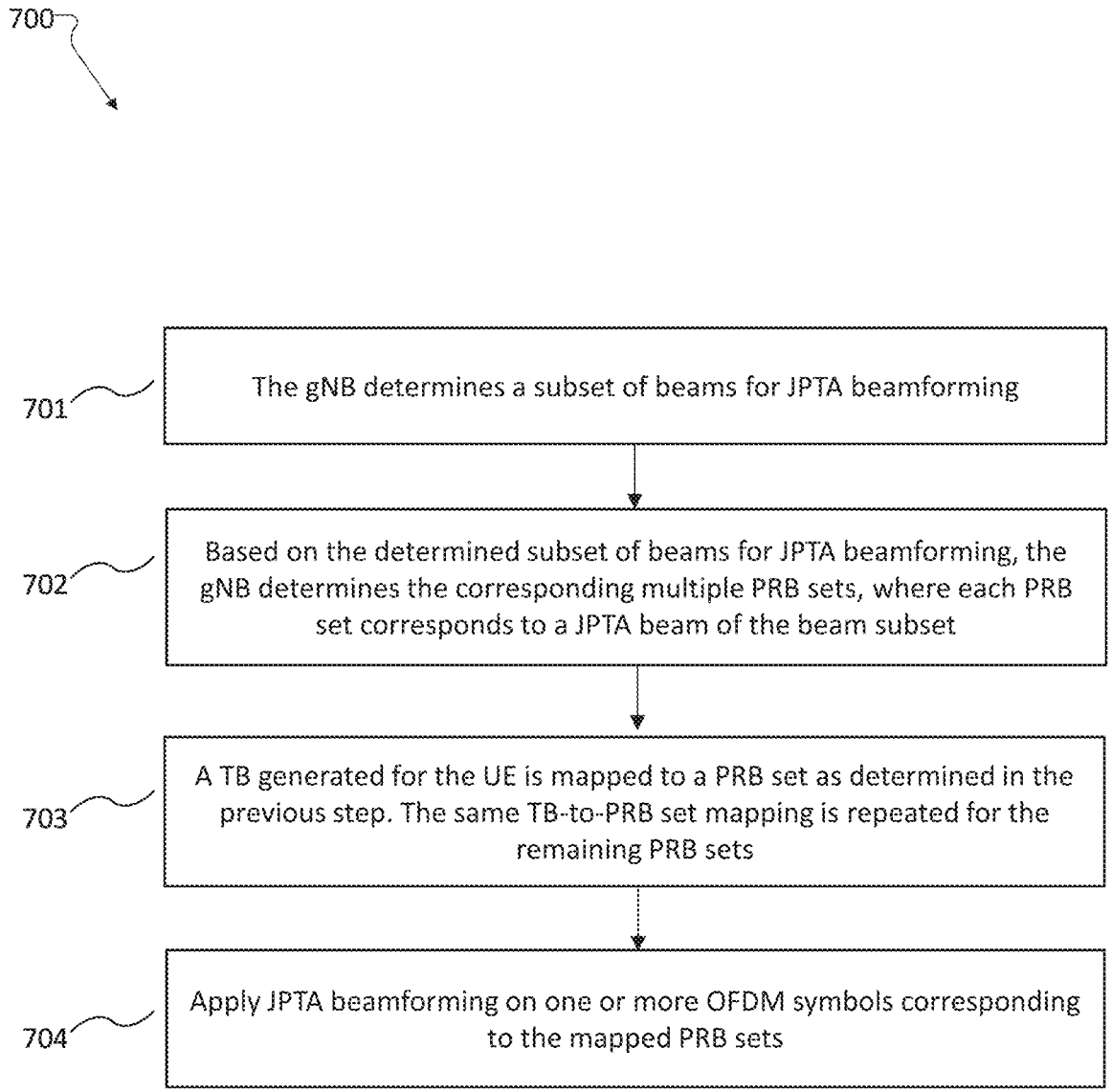
FIG. 7 illustrates a flowchart of an example process for transportation block (TB)-to-physical resource block (PRB) mapping for a UE using JPTA beamforming according to embodiments of the present disclosure.

FIG. 7 illustrates a flowchart of an example process 700 for TB-to-PRB mapping for a UE using JPTA beamforming according to various embodiments of the present disclosure. For example, the process 700 may be implemented by the BS 102. The process 700 is for illustration only and other embodiments can be used without departing from the scope of the present disclosure.

The process begins in step 701, the BS 102 determines a subset of beams for JPTA beamforming that are the most suitable for communication with the UE 116 based on a certain criterion discussed herein.

Upon determining the subset of beams suitable for JPTA beamforming for the UE, in step 702, the BS determines the corresponding multiple PRB sets for data mapping. Each PRB set corresponds to a JPTA beam within the beam subset determined from step 701. The same data is transmitted on each JPTA beam. In step 703, a TB is generated for the UE and is mapped to a PRB set as determined from step 702. This step is repeated for all remaining PRB sets.

In step 704 the BS applies JPTA beamforming to the one or more OFDM symbols corresponding to the mapped PRB sets. The same data for the UE is transmitted in multiple directions corresponding to the JPTA beams. Each duplicated DL TB can be carried by a PDSCH, for example, multiple PDSCHs carrying the same data are multiplexed in the frequency domain. In another example, the duplicated DL TBs can be carried by a single PDSCH.

The duplicated data on each JPTA beam is a TB that can be decoded independently of the other duplicated data. After the UE has received the signals on the PRB sets, if at least one of the TBs is decoded successfully by the UE, the UE can send an ACK to the gNB to indicate successful reception of the data. Otherwise, the UE can send a NACK to indicate that data reception has failed.

Figure 8:
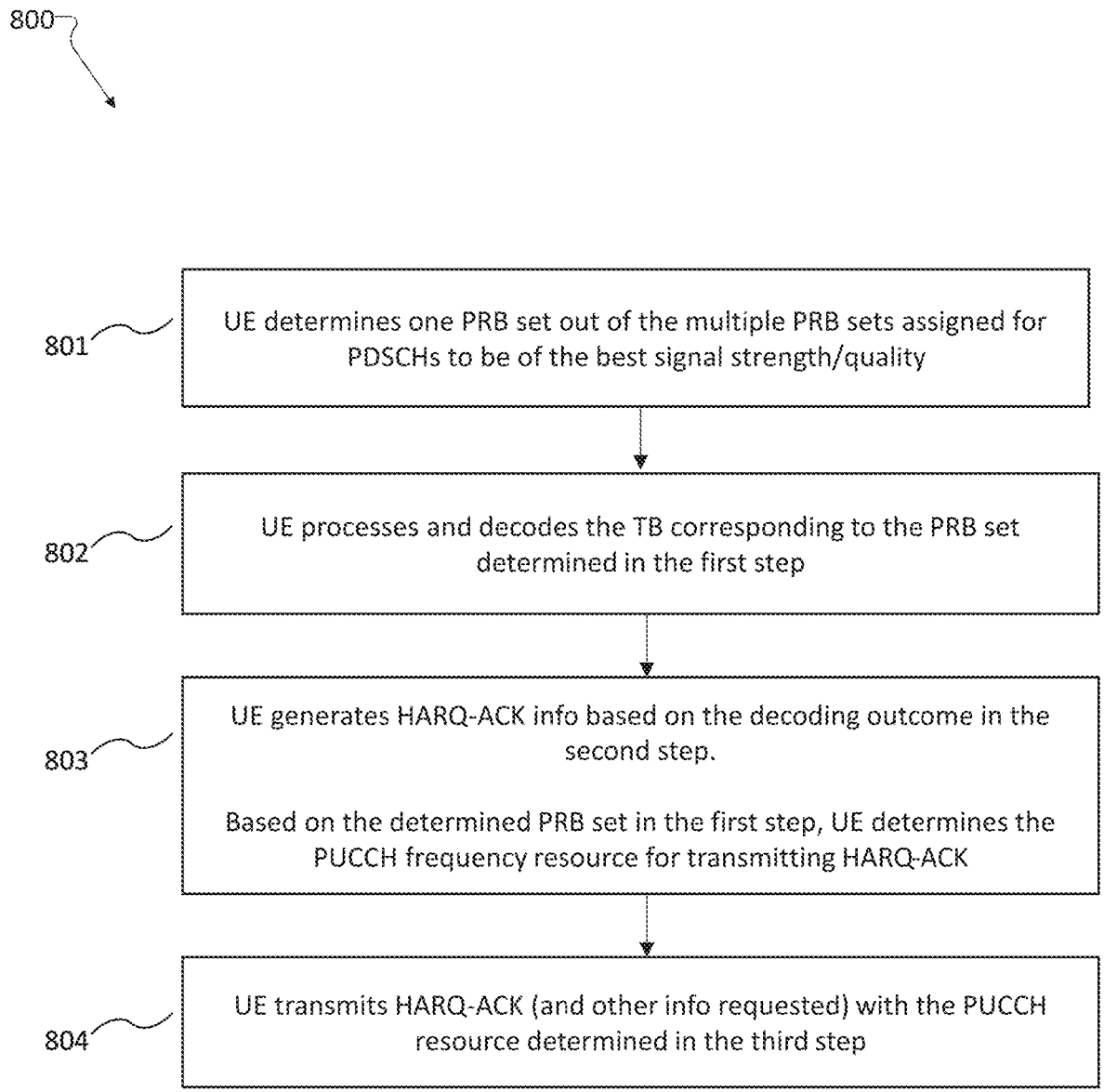
FIG. 8 illustrates a flowchart of an example process for a physical uplink control channel (PUCCH) frequency resource assignment for hybrid automatic repeat request (HARQ) acknowledgement (ACK) feedback for a UE using JPTA beamforming according to embodiments of the present disclosure.

FIG. 8 illustrates a flowchart of an example process 800 for a UE to receive data from the JPTA beams and determine the frequency resource for hybrid automatic repeat request-acknowledgement (HARQ-ACK) feedback according to various embodiments of the present disclosure. For example, the process 800 may be implemented by the UE 116. The process 800 is for illustration only and other embodiments can be used without departing from the scope of the present disclosure.

The process begins in step 801 where, after determining the PRBs assigned by the gNB for data transmission (on PDSCHs), the UE 116 determines one PRB set out of the multiple PRB sets assigned to PDSCH from process 700 to be of the best signal strength and/or quality. For example, this can be based on each PRB set's PDSCH demodulation reference signals (DM-RS) signal strength/quality in terms of signal-to-noise ratio (SNR), and the UE can choose the highest one. Step 801 is beneficial for reducing the UE 116 PDSCH decoding complexity.

In step 802, the UE 116 can then perform PDSCH decoding on the TB corresponding to the PRB set determined from step 801. There are various embodiments for the UE 116 to decode the selected PRB set from step 801. In one embodiment, more than one PRB set can be selected based on a common criterion satisfied by the signals received on the PRB sets and the UE 116 can decode the corresponding PDSCH where the PRB set meets the criterion (e.g., PDSCH DM-RS SNR>threshold). In an additional embodiment, the UE 116 can also perform decoding by combining the soft bits obtained from the multiple PRB sets (multiple PDSCHs) to achieve a better bit error rate (BER)/block error rate (BLER). In yet another alternative, the UE can attempt to decode all the PRBs assigned.

In step 803, the UE 116 generates HARQ-ACK information based on the decoding outcome from step 802. The UE 116 can then determine the PUCCH frequency resource for transmitting the HARQ-ACK based on the determined PRB set from step 801. The frequency resource can be the PRB set which contains the TB decoded by the UE 116 to generate the HARQ-ACK. The UE can determine the PUCCH frequency resource from the frequency resource (PRB set) which contains the TB decoded by the UE to generate the corresponding HARQ-ACK.

In step 804, the UE 116 transmits HARD-ACK with the PUCCH frequency resource determined in step 803 to the BS 102. The UE can determine the PUCCH frequency resource from the frequency resource (PRB set) which contains the TB decoded by the UE for the corresponding HARQ-ACK. In particular, if the PRB set is a part of a frequency subband, then the PUCCH frequency resource is a part of the same frequency subband. For this reason, the JPTA beam used by the BS 102 to receive the PUCCH can be the same one used for transmitting the PDSCH based on the channel reciprocity principle. Alternatively, the UE 116 can send a negative acknowledgement (NACK) to indicate that data reception has failed.

Additionally, the BS 102 can also apply JPTA RX beamforming to receive the HARQ-ACK on PUCCH. The BS 102 may blindly detect which of the PUCCH frequency resources the UE transmits on because the UE can determine the PUCCH frequency resource to use for HARQ-ACK transmission dynamically. The BS 102 can perform this step using a discontinuous transmission (DTX) detection algorithm over the possible PUCCH frequency resources, which can determine the presence of a PUCCH signal using an energy-based detection mechanism. Upon determining the presence of a PUCCH signal in a frequency resource, the BS 102 can perform PUCCH decoding to obtain the HARQ-ACK information.

Figure 9:
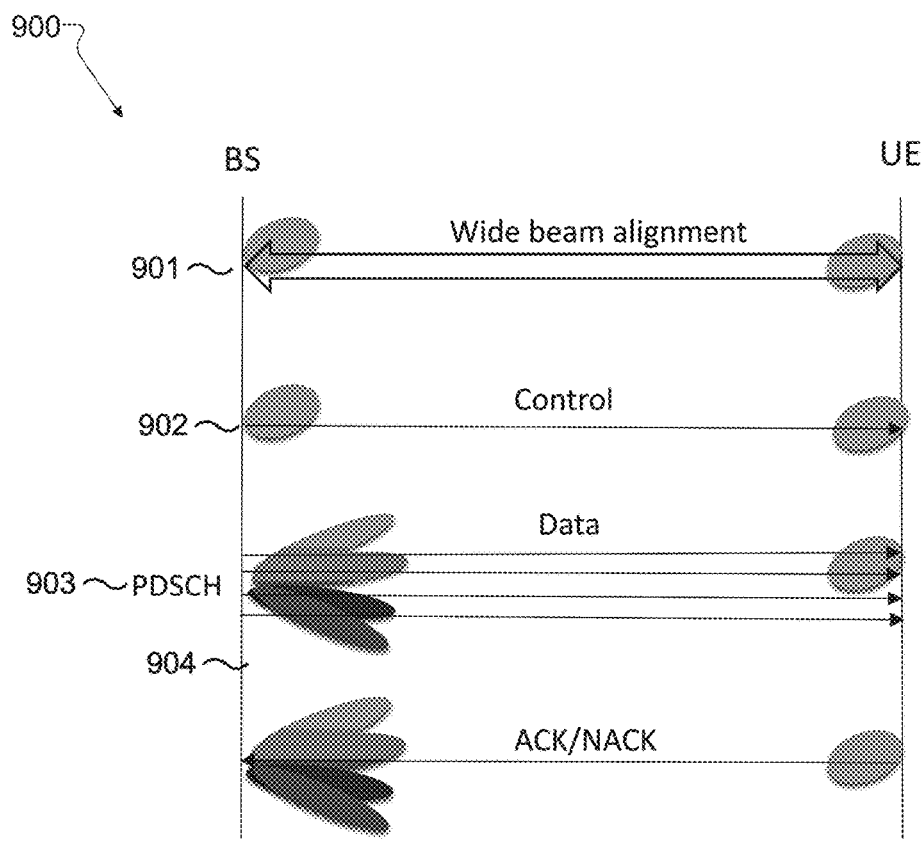
FIG. 9 illustrates an example process to determine the subset of beams for JPTA beamforming according to embodiments of the present disclosure.

FIG. 9 illustrates a flowchart of an example process 900 to determine the subset of beams for JPTA beamforming according to various embodiments of the present disclosure. For example, the beam subset can be the NBs corresponding to the children beams of the WB to which the UE 116 is aligned with. For example, the process 900 may be implemented by the UE 116. The process 900 is for illustration only and other embodiments can be used without departing from the scope of the present disclosure.

The process begins in step 901, the BS 102 and the UE 116 perform a wide beam (WB) alignment procedure using, for example, BS 116's single-sideband modulation (SSB) or channel state information reference signal (CSI-RS) as the reference. The SSB and/or CSI-RS can be transmitted on BS 102's WB. The BS 102 beam that the UE is aligned with can be represented as transmission configuration information state (TCI state). After the WB alignment, the best BS 102 WB and the corresponding UE beam are determined. The BS 102 determines the best narrow beams (NBs) of the aligned WB for applying JPTA beamforming.

In step 902, communication between the BS 102 and the UE 116 is performed using the aligned BS 102 WB. The BS 102 send a control channel to the UE 116 using the WB. Upon a DL data arrival for the UE 116, the control channel (e.g., a PDCCH) can carry a DCI scheduling the PDSCHs for the UE. The DCI includes the resource scheduling information to enable the UE to receive the multiple PDSCHs.

In step 903, the BS 102 sends the same data multiplexed in the frequency domain on the PDSCHs using JPTA beamforming. The UE 116 receives the PDSCHs using its RX beam aligned with the BS 102's WB. The UE 116 determines the PUCCH frequency resource according to the embodiments in this disclosure and sends the corresponding HARQ-ACK on the PUCCH resource. The BS 102 then receives the possible PUCCHs transmitted by the UE using NBs formed with JPTA beamforming in step 904.

In other embodiments for process 900 in FIG. 9, the PDCCHs and the PDSCHs are both transmitted with JPTA beamforming. The UE 116 can receive the multiple PDCCHs using the same principle as that for receiving the multiple PDSCHs. The frequency resources for the multiple PDCCHs can be implicitly configured with a mapping configuration between the aligned BS 102 WB and a set of frequency resources for PDCCHs. As the aligned BS 102 WB changes for the UE 116 due to mobility, the set of frequency resources for the PDCCHs is also changed.

In yet another embodiment, the BS 102 and the UE 116 can achieve NB alignment for the PDCCH reception, for example, based on the UE measurement of the NB reference signals such as a CSI-RS. The UE 116 can receive the PDCCHs using its RX beam aligned with the BS 102's NB. However, for the corresponding data transmission, the BS 102 still sends the same data on the PDSCHs multiplexed in the frequency domain using JPTA beamforming. The set of JPTA beams can be based on the set of spatially adjacent narrow beams to the narrow beam used for the PDCCH transmission. This scheme has the advantage to boost the robustness of the PDSCH reception which is typically transmitted with a higher modulation coding scheme (MCS) than that for the PDCCH, in case the narrow beam alignment may not be perfect.

Figure 10:
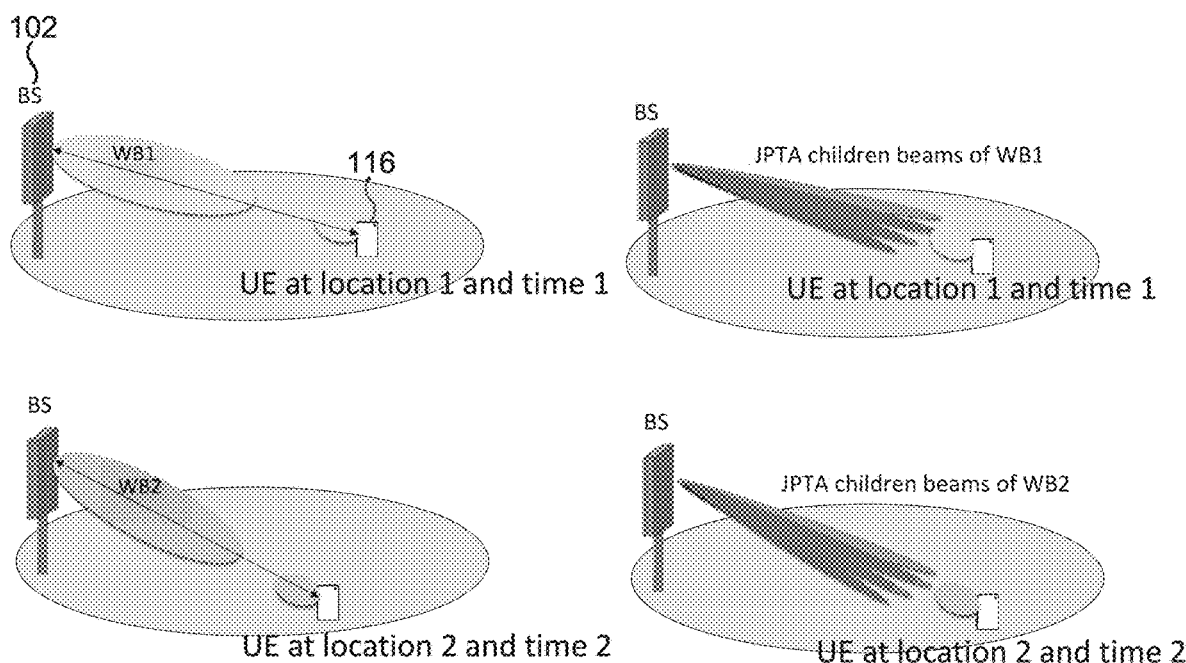
FIG. 10 illustrates examples of a JPTA beamforming on a beam set according to embodiments of the present disclosure.

FIG. 10 illustrates examples of a JPTA beamforming 1000 on a beam set according to embodiments of the present disclosure. For example, to adapt to UE mobility or the change in resource channel, the set of JPTA beams to transmit the duplicated data to the UE 116 is updated as the gNB beam to be aligned for the UE 116 is updated based on a beam measurement and reporting procedure. This example is for illustration only and other embodiments can be used without departing from the scope of the present disclosure.

As illustrated in FIG. 10, in one embodiment, the UE 116 is at location 1 at time 1. The best beam for the UE 116 is WB1, and the BS 102 uses the children beams of WB1 for JPTA beamforming to transmit the duplicated data to the UE 112. When the UE 116 moves to location 2 at time 2, the best beam for the UE 116 has also changed to WB2. The BS 102 then uses the children beams of WB2 for JPTA beamforming to transmit the duplicated data to the UE 116.

In another embodiment, the set of JPTA beams that transmit the duplicated data to the UE 116 is updated based on the last NB alignment. The JPTA beams include the last aligned BS 102 NB and the surrounding NBs. The number of surrounding beams can be determined based on the time elapsed since the last NB alignment, and/or the estimation of the UE 116's speed.

In yet another embodiment, the set of JPTA beams to transmit the duplicated data to the UE 116 is updated based on the last NB alignment and the updated WB alignment for the UE 116. The set of JPTA sets can be selected as a subset of the children beams of the updated WB which are close to the last aligned NB. The size of the subset can be determined by the time elapsed since the last NB alignment, and/or the NB and WB directions, and/or the UE speed.

Figure 11:
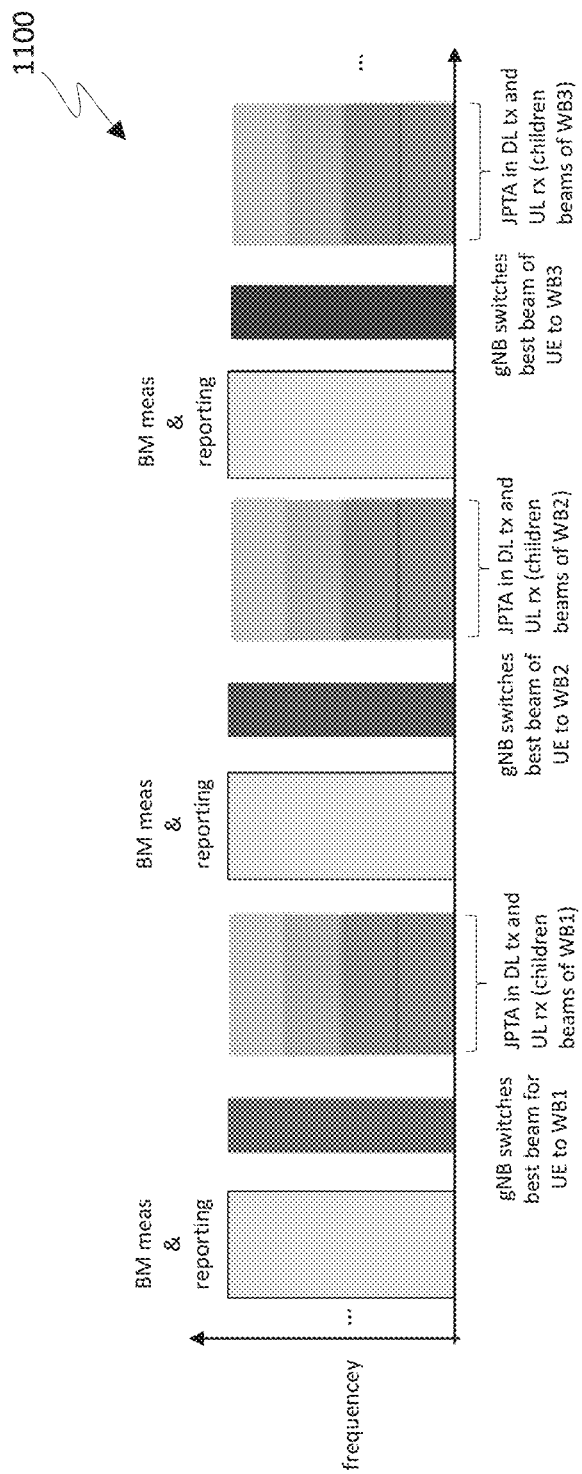
FIG. 11 illustrates an example resource diagram for JPTA beamforming resource updates for a UE according to embodiments of the present disclosure.

FIG. 11 illustrates an example resource diagram 1100 for JPTA beamforming resource updates for a UE according to embodiments of the present disclosure. The diagram 1100 is for illustration only and other embodiments can be used without departing from the scope of the present disclosure. Corresponding with UE 116's mobility, FIG. 11 illustrates an example of a JPTA resource update. The JPTA beams for the UE 116 is updated over time as a result of the BS 102 beam update from the beam management procedure illustrated, for example, in FIG. 9.

Figure 12:
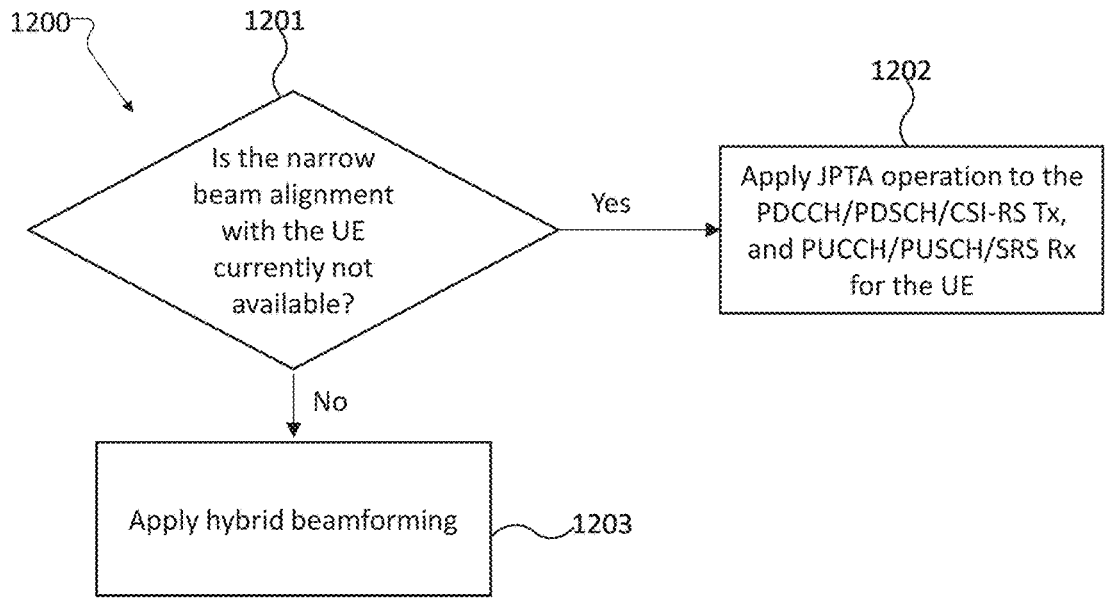
FIG. 12 illustrates a flowchart of an example process for configuring JPTA operation for a UE according to embodiments of the present disclosure.

FIG. 12 illustrates a flowchart of an example process 1200 for configuring JPTA operation based on meeting a certain condition, according to various embodiments of the present disclosure. For example, the process 1200 may be implemented by the BS 102. The process 1200 is for illustration only and other embodiments can be used without departing from the scope of the present disclosure.

An advantage of configuring JPTA operation when the condition is met is saving resources for data duplication. In the example illustrated in FIG. 12, the condition is whether narrow beam alignment with the UE is currently not available (step 1201). If the condition is met, JPTA operation is configured and applied to the UE 116 through various available frequency resources (step 1202). For example, JPTA beamforming can be applied to any DL channel or signal transmission (such as PDCCH/PDSCH/CSI-RS) and any UL channel or signal reception (such as PUCCH/PUSCH/sounding reference signal (SRS)) from the UE 116. If the condition is not met, then analog or hybrid beamforming can be applied to the UE 116 (step 1203). In one embodiment, the condition corresponds to whether NB alignment is achieved with the UE 116 using one of the JPTA beams. An example of this is discussed with regard to FIG. 9. If NB alignment is not achieved, then JPTA operation is applied by the BS 102 and transmitted with duplicated data to the UE 116 to mitigate performance degradation from the lack of NB alignment; otherwise, analog beamforming can be applied to the UE 116.

The present disclosure provides additional embodiments of conditions that can be met for configuring JPTA operation. For example, if the data is latency sensitive and the NB alignment is not yet achieved, then JPTA operation is applied, else analog beamforming can be applied. In another example, if the network 130 wants to reduce the overhead of RS resources and/or UE 116 reporting needed for NB alignment procedure, the network 130 can configure the JPTA operation to achieve this purpose. In yet another example, the condition can be if the UE 116 is on the cell edge and there is an outage risk due to a low UL signal quality/strength. The BS 102 can configure the JPTA operation to increase the UL transmission duration of the UE 116 to enhance the UL channel. This can be done, for example, through repetition of the PUCCH.

Figure 13:
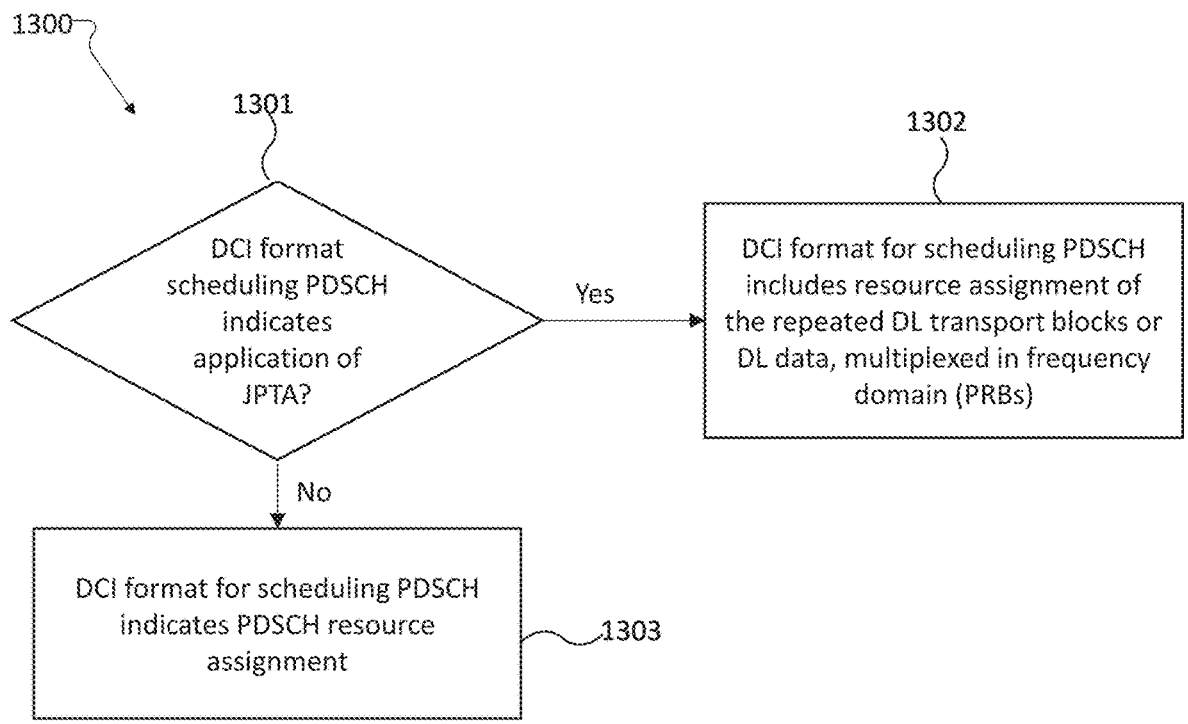
FIG. 13 illustrates a flowchart of an example process for a frequency resource indication in downlink (DL) control information (DCI) formats for a physical downlink shared channel (PDSCH) for the application of JPTA beamforming according to embodiments of the present disclosure.
Figure 14:
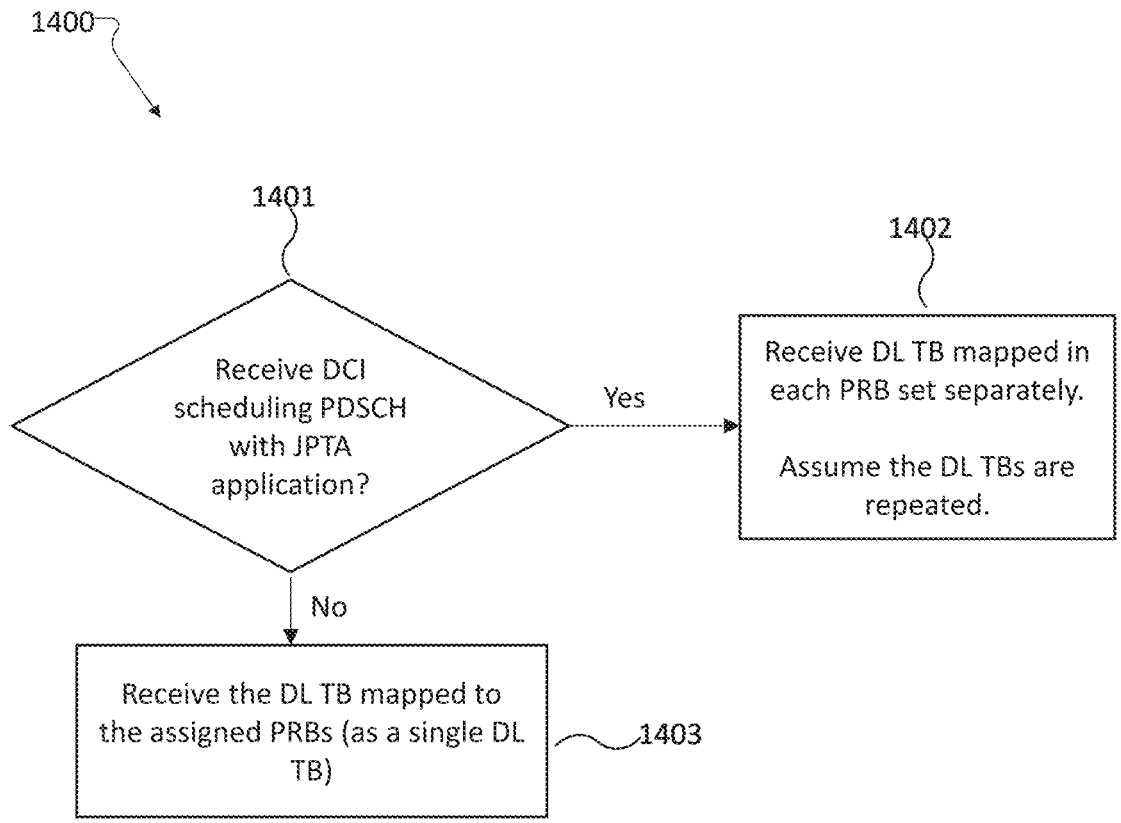
FIG. 14 illustrates a flowchart of an example process for receiving DCI scheduling PDSCH with JPTA application according to embodiments of the present disclosure.

FIG. 13 illustrates a flowchart of an example process 1300 for a frequency resource indication in DCI format for scheduling PDSCH to indicate operation in JPTA for the UE 116 and FIG. 14 illustrates a flowchart of an example process 1400 for receiving DCI scheduling PDSCH with JPTA application according to embodiments of the present disclosure according to various embodiments of the present disclosure. For example, the process 1300 may be implemented by the BS 102 and the process 1400 may be implemented by the UE. The processes 1300 and 1400 are for illustration only and other embodiments can be used without departing from the scope of the present disclosure.

In order to enable dynamic configuration of JPTA operation, a signaling mechanism can be used by the network to indicate to the UE if a JPTA operation is in effect. In one embodiment, the application of JPTA for scheduling PDSCH can be indicated by a single bit in the DCI format(s). If the DCI format for scheduling PDSCH that indicates the application of JPTA in step 1301, the DCI format for scheduling PDSCH includes a frequency resource assignment of the repeated DL TBs or PRBs in step 1302. Otherwise, the DCI format for scheduling PDSCH indicates using an analog PDSCH frequency resource assignment in step 1303. Other embodiments of alternate signaling methods are possible as well. For example, using signaling indication from medium access control (MAC) control element (CE) or radio resource control (RRC).

The corresponding UE behavior is illustrated in FIG. 14. In this illustrative example, the UE 116 receives an indication regarding if JPTA operation is being applied in step 1401. If the UE 116 receives a DCI format scheduling PDSCH indicating JPTA application, the UE 116 receives DL TBs mapped to each PRB set, separately, and assumes the DL TBs are repeated in step 1402. Else, the received DL TBs are mapped to the assigned PRBs as a single DL TB in step 1403.

In various embodiments, the UE 116 can apply JPTA beamforming for signal transmission and/or reception. For example, the UE 116 can have a set of wide beams and narrow beams in a form of a hierarchical beam codebook. When the UE 116 has lost track of its narrow beam alignment or when the UE 116 has not yet determined the best narrow beam, the UE 116 can form a set of JPTA beams which can be the children beams of its aligned wide beam.

In another example, for DL transmission, such as the transmission of the PDSCH, the gNB 102 can transmit the same PDSCH data, repeated over multiple PRB sets using a DL transmission beam. A PDSCH is mapped to a PRB set. The UE 116 then attempts to receive/process the PDSCHs using its JPTA receive beams. The procedure illustrated in FIG. 8 can be applied to determine the appropriate PRB set to process the PDSCH and to determine the frequency resource for PUCCH to send the corresponding HARQ-ACK. The UE 116 can use this procedure to determine its best narrow Rx beam and recover/achieve its narrow beam alignment with the gNB transmit beam. Exploiting Tx-Rx beam reciprocity/correspondence, the UE 116 can also use this procedure to determine the appropriate narrow Tx beam to transmit the PUCCH or other UL channels/signals subsequently.

Figure 15:
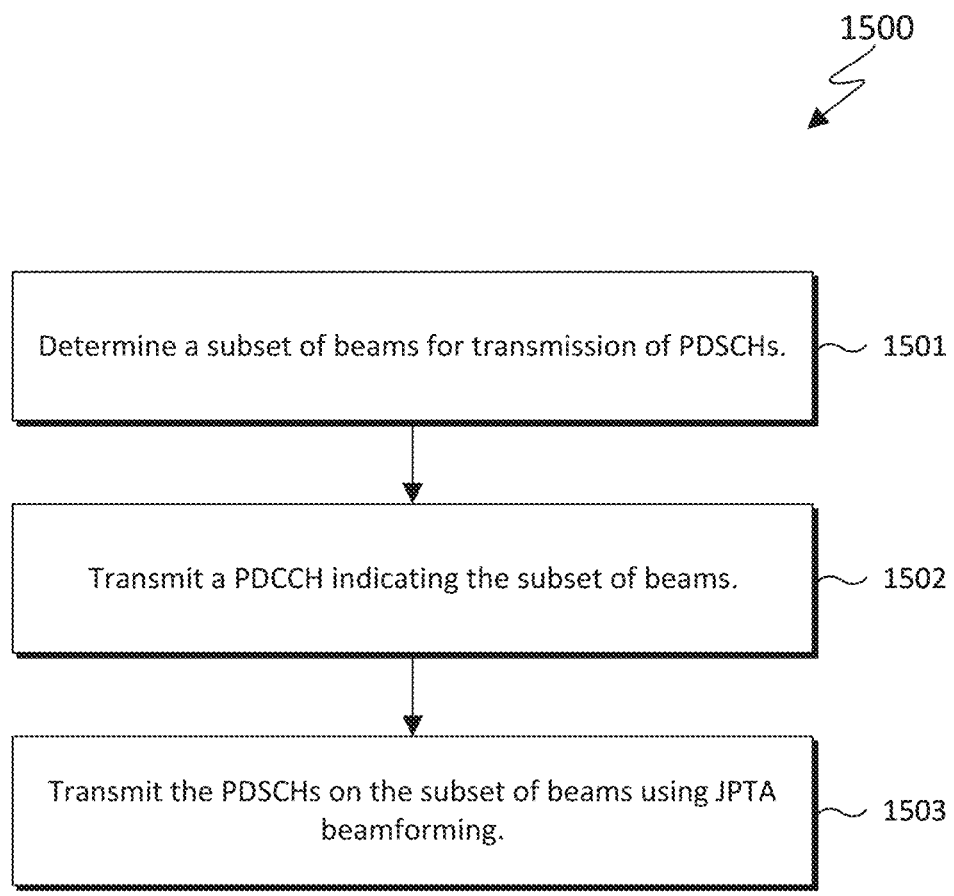
FIG. 15 illustrates a flowchart for an example method for determining a subset of beams to transmit PDSCHs according to embodiments of the present disclosure.

FIG. 15 illustrates a flowchart for an example method 1500 for determining a subset of beams for transmitting PDSCHs according to embodiments of the present disclosure. The steps of the method 1500 of FIG. 15 can be performed by BS 102 of FIG. 2 and a corresponding process can be performed by the UE 116 of FIG. 3. The method 1500 is for illustration only and other embodiments can be used without departing from the scope of the present disclosure.

The method begins in step 1501 with the BS 102 determining a subset of beams for transmission of PDSCHs based on a WB alignment procedure. In various embodiments, the BS 102 may first detect whether a condition for enabling the JPTA beamforming occurs and determining to perform the JPTA beamforming based on detecting the condition.

The BS 102 then transmits a PDCCH indicating the subset of beams in step 1502. For example, the BS may determine a WB based on the WB alignment procedure and determine the subset of beams by selecting the subset of beams for transmission of the PDCCHs from children beams of the determined WB. In another example, the BS may determine a WB based on the WB alignment procedure and transmit the PDCCH on the determined WB, where this PDCCH includes scheduling information for the PDSCHs.

In various embodiments, the BS 102 further determines the subset of beams for transmission of PDCCHs and the PDCCH is one of the PDCCHs and is transmitted on one of the subset of beams. In this embodiments, the BS may also transmit other ones of PDCCHs on other ones of the subset of beams using the JPTA beamforming where the same information is transmitted in each of the PDCCHs.

In various embodiments, the BS 102 earlier determines to enable the JPTA beamforming and includes configuration information indicating that the JPTA beamforming is enabled in the PDCCH.

The BS 102 then transmits the PDSCHs on the subset of beams, respectively, using a JPTA beamforming in step 1503. For example, in step 1503, the same data is included in each of the PDSCHs.

In various embodiments, the beams in subset of beams are transmitted on frequency resources in a subset of frequency resources, respectively. The BS 102 may then determine a frequency resource, on which to receive a PUCCH, from the subset of frequency resources based on performing blind decoding on the subset of frequency resources, receive the PUCCH on the determined frequency resource and, decoding, based on the PUCCH, HARQ-ACK information associated with the PDSCHs.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the descriptions in this application should be read as implying that any particular element, step, or function is an essential element that must be included in the claims scope. The scope of patented subject matter is defined by the claims.

What is claimed is:

1. A base station (BS), comprising:
a processor configured to determine, based on a wide-beam (WB) alignment procedure, a subset of beams for transmission of physical downlink shared channels (PDSCHs); and
a transceiver operably coupled to the processor, the transceiver configured to:
transmit a physical downlink control channel (PDCCH) indicating the subset of beams, and
transmit the PDSCHs on the subset of beams, respectively, using a joint phase-time array (JPTA) beamforming,
wherein same data is included in each of the PDSCHs.

2. The BS of claim 1, wherein:
the beams in the subset of beams are transmitted on frequency resources in a subset of frequency resources, respectively;
the processor is further configured to determine a frequency resource, on which to receive a physical uplink control channel (PUCCH), from the subset of frequency resources based on performing blind decoding on the subset of frequency resources;
the transceiver is further configured to receive the PUCCH on the determined frequency resource; and
the processor is further configured to decode, based on the PUCCH, hybrid automatic repeat request acknowledgement (HARQ-ACK) information associated with at least one of the PDSCHs.

3. The BS of claim 1, wherein the processor is further configured to:
determine a WB based on the WB alignment procedure; and
select the subset of beams for transmission of the PDCCHs from children beams of the determined WB.

4. The BS of claim 1, wherein:
the processor is further configured to determine a WB based on the WB alignment procedure,
the transceiver is further configured to transmit the PDCCH on the determined WB, and
the PDCCH includes scheduling information for the PDSCHs.

5. The BS of claim 1, wherein:
the subset of beams is further determined for transmission of PDCCHs,
the PDCCH is one of the PDCCHs and is transmitted on one of the subset of beams, and
the transceiver is further configured to transmit other ones of PDCCHs on other ones of the subset of beams using the JPTA beamforming,
same information is transmitted in each of the PDCCHs.

6. The BS of claim 1, wherein the processor is further configured to:
detect whether a condition for enabling the JPTA beamforming occurs; and
determine to perform the JPTA beamforming based on detecting the condition.

7. The BS of claim 1, wherein the processor is further configured to:
determine to enable the JPTA beamforming, and
include configuration information indicating that the JPTA beamforming is enabled in the PDCCH.

8. A user equipment (UE), comprising:
a processor configured to perform on a wide-beam (WB) alignment procedure; and
a transceiver operably coupled to the processor, the transceiver configured to:
receive a physical downlink control channel (PDCCH) indicating a subset of beams for reception of physical downlink shared channels (PDSCHs), the subset of beams associated with the WB alignment procedure, and
receive at least one of the PDSCHs on at least one of the subset of beams using a joint phase-time array (JPTA) beamforming,
wherein same data is included in each of the PDSCHs.

9. The UE of claim 8, wherein:
the beams in the subset of beams are on frequency resources in a subset of frequency resources, respectively;
the processor is further configured to:
identify a frequency resource, from the subset of frequency resources, on which the at least one PDSCH was received, and
generate hybrid automatic repeat request acknowledgement (HARQ-ACK) information associated with the at least one PDSCH; and
the transceiver is further configured to transmit a PUCCH including the HARQ-ACK information on the identified frequency resource.

10. The UE of claim 8, wherein the subset of beams are children beams of a WB from the WB alignment procedure.

11. The UE of claim 8, wherein:
the transceiver is further configured to receive the PDCCH on a WB from the WB alignment procedure, and
the PDCCH includes scheduling information for the PDSCHs.

12. The UE of claim 8, wherein:
the PDCCH is one of a plurality of PDCCHs and is received on one of the subset of beams using JPTA beamforming, and
same information is in each of the PDCCHs.

13. The UE of claim 8, wherein:
the PDCCH includes configuration information indicating that the JPTA beamforming is enabled, and
the processor is further configured to determine, based on the configuration information, to use the JPTA beamforming for reception of the at least one PDSCH.

14. A method for operating a base station (BS), the method comprising:
determining, based on a wide-beam (WB) alignment procedure, a subset of beams for transmission of physical downlink shared control channels (PDSCHs);
transmitting a physical downlink control channel (PDCCH) indicating the subset of beams; and
transmitting the PDSCHs on the subset of beams, respectively, using a joint phase-time array (JPTA) beamforming,
wherein same data is included in each of the PDSCHs.

15. The method of claim 14, wherein the beams in subset of beams are transmitted on frequency resources in a subset of frequency resources, respectively, the method further comprising:
determining a frequency resource, on which to receive a physical uplink control channel (PUCCH), from the subset of frequency resources based on performing blind decoding on the subset of frequency resources;
receiving the PUCCH on the determined frequency resource; and
decoding, based on the PUCCH, hybrid automatic repeat request acknowledgement (HARQ-ACK) information associated with the PDSCHs.

16. The method of claim 14, further comprising:
determining a WB based on the WB alignment procedure,
wherein determining the subset of beams further comprises selecting the subset of beams for transmission of the PDCCHs from children beams of the determined WB.

17. The method of claim 14, further comprising:
determining a WB based on the WB alignment procedure; and
transmitting the PDCCH on the determined WB, wherein the PDCCH includes scheduling information for the PDSCHs.

18. The method of claim 14, wherein:
the subset of beams is further determined for transmission of PDCCHs,
the PDCCH is one of the PDCCHs and is transmitted on one of the subset of beams,
the method further comprises transmitting other ones of PDCCHs on other ones of the subset of beams using the JPTA beamforming, and
same information is transmitted in each of the PDCCHs.

19. The method of claim 14, further comprising:
detecting whether a condition for enabling the JPTA beamforming occurs; and
determining to perform the JPTA beamforming based on detecting the condition.

20. The method of claim 14, further comprising:
determining to enable the JPTA beamforming; and
including configuration information indicating that the JPTA beamforming is enabled in the PDCCH.

* * * * *